United States Patent [19]
Chen

[11] Patent Number: 5,310,203
[45] Date of Patent: May 10, 1994

[54] BICYCLE SHOCK-ABSORBING APPARATUS

[76] Inventor: Tsai L. Chen, No. 2, Lane 371, Hua Cheng Rd., Hsin Chuang City, Taipei Hsien, Taiwan

[21] Appl. No.: 984,849

[22] Filed: Dec. 3, 1992

[51] Int. Cl.⁵ .............................. B62K 25/08
[52] U.S. Cl. .................... 280/276; 280/275; 267/294; 267/141.1
[58] Field of Search ............ 280/277, 276, 275, 279, 280/280, 283, 286; 267/141.1, 141, 153, 292, 293, 294; 188/20

[56] References Cited

U.S. PATENT DOCUMENTS

| | | | |
|---|---|---|---|
| 3,259,397 | 7/1966 | Doennecke | 267/294 |
| 4,971,344 | 11/1990 | Turner | 280/276 |
| 5,060,961 | 10/1991 | Bontrager | 280/279 |
| 5,193,832 | 3/1993 | Wilson et al. | 280/276 |
| 5,193,833 | 3/1993 | Reisinger | 280/277 |

FOREIGN PATENT DOCUMENTS

| | | | |
|---|---|---|---|
| 0872359 | 6/1942 | France | 280/276 |
| 1091192 | 4/1955 | France | 280/276 |
| 0240391 | 9/1989 | Japan | 280/276 |

*Primary Examiner*—Karin L. Tyson
*Assistant Examiner*—Anne Marie Boehler
*Attorney, Agent, or Firm*—Poms, Smith, Lande & Rose

[57] ABSTRACT

A bicycle shock-absorbing apparatus includes an upper tube telescopically received in a lower tube. A plurality of compressive members are positioned inside the upper tube. A socket bolt member having a socket portion and a rod portion is mounted on a mount member of the lower tube by its rod portion while allowing its socket portion to be slidably received in a lower portion of the upper tube and to contact against a bottom one of the compressive members. When the bicycle receives a shock from an uneven terrain, the upper tube slides downward inside the lower tube while the compressive members therein will be compressed, thereby absorbing the shock.

8 Claims, 3 Drawing Sheets

BICYCLE SHOCK-ABSORBING APPARATUS

BACKGROUND OF THE INVENTION

This invention relates to a bicycle shock-absorbing apparatus, and more particularly, to an apparatus that utilizes elastomer polymers instead of springs or the like to absorb a shock from an uneven terrain.

A conventional bicycle does not have any shock-absorbing apparatus attached to either the front or rear wheel axle. Therefore, a biker will feel discomfort when passing over an uneven terrain. In addition, long term use on an uneven terrain will damage the bicycle. With the above drawbacks, the bicycle needs to be improved to have better performance.

An off-road bicycle (or a mountain bicycle) is popularly used for sport and leisure. Therefore, a safe and trouble-free bicycle is a basic requirement for off- road use. A number of front fork designs have been disclosed for off-road motorcycles. However, a bicycle is quite different to a motorcycle in many ways, such as the momentum of a motorcycle is much greater than that of a bicycle under normal use, as a motorcycle has a greater mass and is used at higher speeds than those of a bicycle. Therefore, simply adapting a current motorcycle shock-absorbing apparatus onto a bicycle is not feasible.

U.S. Pat. No. 4,971,344, teaches a bicycle with a front fork wheel suspension that utilizes a pair of telescoping tubes and a spring-loaded valve, so that the latter can regulate the flow of fluid between the pair of telescoping tubes and thus absorb shock from an impact.

U.S. Pat. No. 5,094,324, which belongs to the present inventor, also discloses a bicycle shock-absorbing apparatus comprising an inner tube, a valve device, and an outer tube cooperating with a pair of springs and damping oil loops therein for absorbing the shock impact from an uneven terrain.

Another U.S. Pat. No. 5,088,705, which also belongs to the present inventor, discloses a bicycle shock-absorbing apparatus comprising an inner tube and an outer tube. An upper spring socket and an lower spring socket are disposed in the inner tube and the outer tube separately. A compression spring is disposed between the spring sockets, oil being filled between the spring sockets. The inner tube is fixedly attached to the upper spring socket and corelatedly actuated with the spring to achieve a shock absorbing effect.

However, the above disclosures utilize springs which are apt to loose elasticity in use over a long time. The change of the spring(s) is cumbersome because the spring has to be linked with corelated socket(s) and the damping oil will cause trouble when changing the spring.

SUMMARY OF THE INVENTION

It is an object of the present invention to provide a bicycle shock-absorbing apparatus which releases a shock pressure by a plurality of compressive units made of elastomer polymer material which is clean and easily changed when comparing to a conventional spring and oil type shock-absorbing device.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
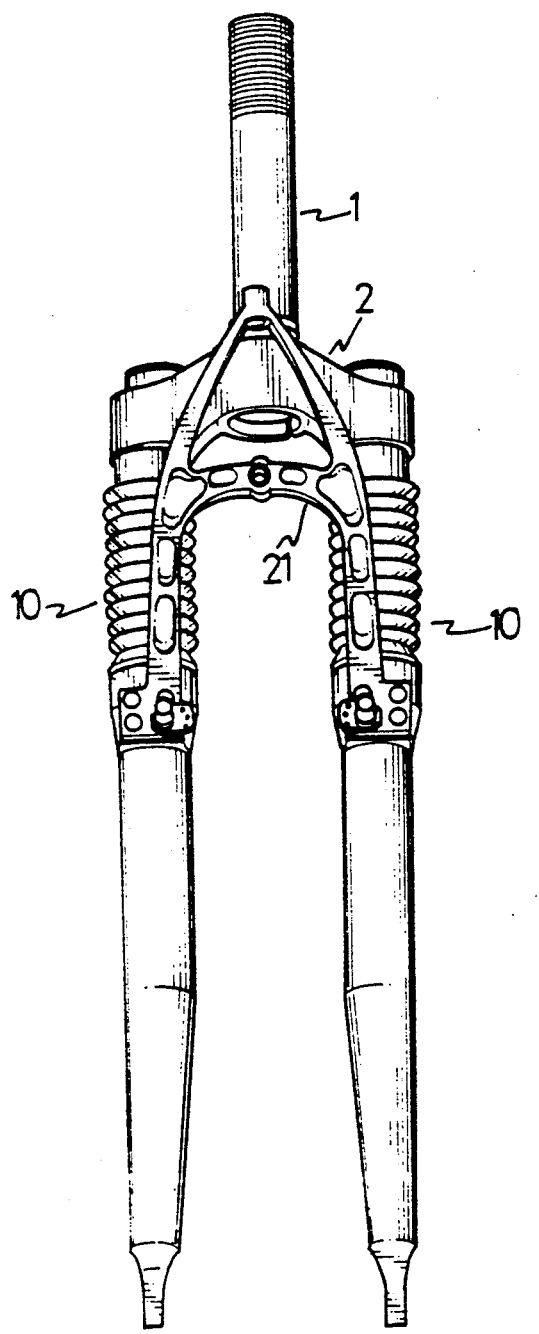
FIG. 1 is a schematic outlook of a bicycle fork with a pair of shock-absorbing apparatuses of a preferred embodiment in accordance with the present invention.

Referring to FIG. 1, a bicycle shock-absorbing apparatus 10 is clamped in a steerer crown 2 of a bicycle (not shown). The steerer crown 2 is engaged to a steerer tube 1 of a bicycle. A sleeve 3 and a C-clip 4 cooperates to reinforce the engagement of the steerer crown 2 and the steerer tube 1. A cable stop bracket 21 is attached to the shock-absorbing apparatus 10 for receiving brake cables (not shown) therethrough. The cable stop bracket 21 can also reinforce the strength between the two shock-absorbing apparatuses.

Figure 2:
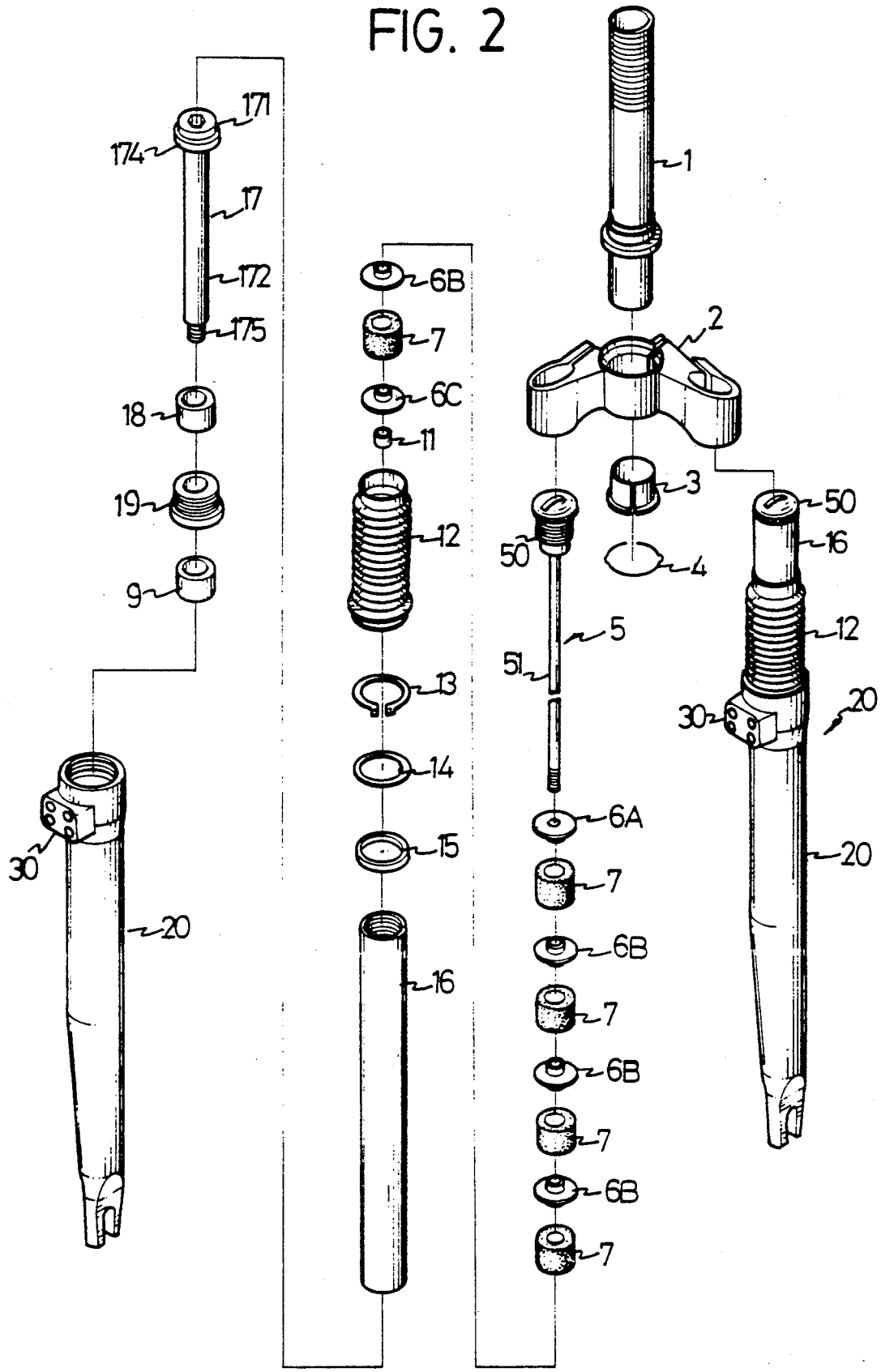
FIG. 2 is an exploded view of the bicycle shock-absorbing apparatus of FIG. 1.
Figure 3:
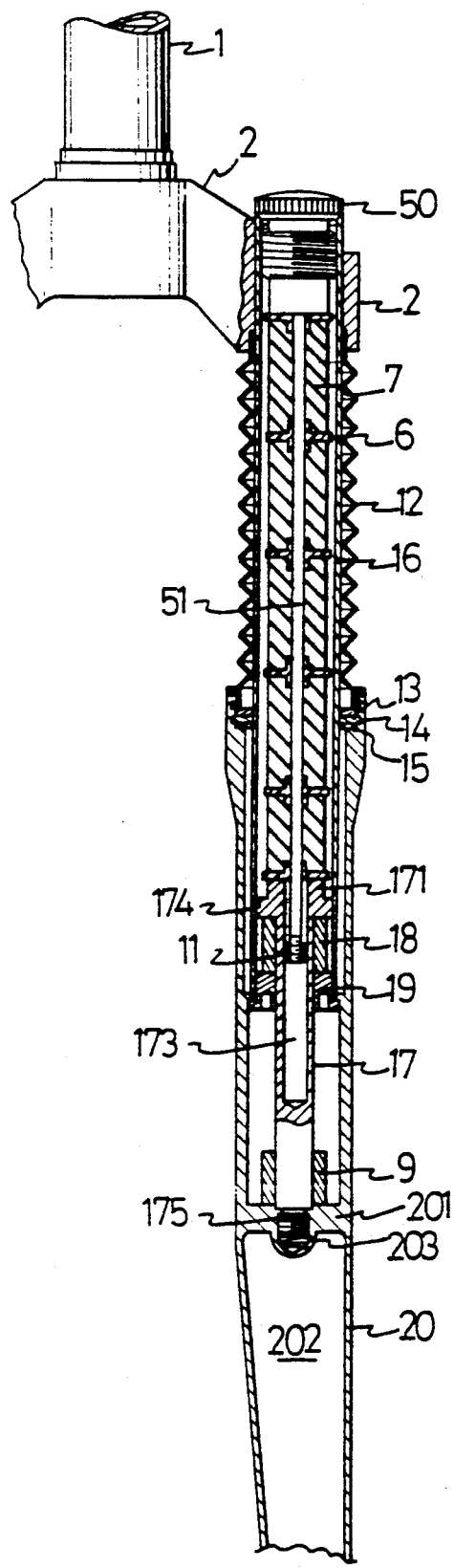
FIG. 3 is a cross-sectional view of the bicycle shock-absorbing apparatus in non-compressed status.

Referring to FIGS. 2 and 3, the bicycle shockabsorbing apparatus 10 comprises a lower tube 20 which has an upper cavity 200 and a lower cavity 202 with a mount member 201 formed therebetween. A socket portion 30 having four holes (not labeled) is integrally formed on an upper periphery of the lower tube 20 for receiving and engaged with the cable stop bracket 21. Also referring to FIG. 1, the cable stop bracket 2 also has four corresponding holes (not labeled) thus allowing four bolts (not labeled and only shown one) to engage the cable stop bracket 21 to the socket portion 30 of the lower tube 20. The mount member 201 is integrally formed with the inner wall of the lower tube 20 and has a threaded recess facing to the upper cavity 200. A lower terminal of the lower tube 20 is attached to a front wheel axle (not shown) of the bicycle. An upper tube 16 is partially and slidably received within the upper cavity of the lower tube 20. A rod means 5 having a cap portion 50 and a rod member 51 downwardly extending from the cap portion 50. The cap portion 50 of the rod means 5 is threadedly engaged to an upper end of the upper tube 16. The cap portion 50 has threads therearound and the upper end of the upper tube 16 has corresponding threads in the inner wall thereof. A bellows 12 is threadedly engaged on a top end of the lower tube 20. The bellows 12 has threads at the bottom end thereof and the top end of the lower tube 20 also has corresponding threads therearound for engaging with the bottom end of the bellows 12. The bellows 12 together with the lower tube 20 slidably receives the upper tube 16, with an upper portion of the upper tube 16 still projecting out of the bellows 12. The upper tube 16 and the bellows 12 are clamped by the steerer crown 2. The periphery of the bellows 12 has diameter greater than the lower tube 20, thereby preventing dust or the like to drop into the lower tube 20. A plurality of compressive units 7 are stacked longitudinally inside the upper tube 16 while allowing the upper tube to move relatively thereto, as will be described later. Each of the compressive units 7 is shaped as a cylinder and has a central hole therethrough. The central holes of the compressive units 7 are in alignment with each other. Each compressive unit 7 is preferred to be an elastomer polymer cylinder 7. A plurality of centrally holed washer members 6 are interposed between the elastomer polymer cylinders 7 for distributing the tension thereof when the elastomer polymer cylinders 7 are compressed by external force.

The rod member 51 of the rod means 5 is centrally located through the central holes of the elastomer polymer cylinders 7 and the washer members 6 for maintaining the central holes in an axis when the elastomer polymer cylinders 7 and the washer members 6A, 6B, and 6C are compressed by external force. A socket bolt means 17 having an upper socket 171 having a flange portion 174 and a lower bolt member 172 with a channel 173 defined from the upper socket 171 down to the lower bolt member 172 for slidably receiving the is threadedly engaged to a bottom end of the rod member 51 substantially contacting with the periphery of the channel 173 of the socket bolt means 17, thereby enabling the rod member 51 to slide down more stably inside the channel 173 of the socket bolt means 17 when the bicycle shock-absorbing apparatus 10 receives a shock. Moreover, the threaded collar 11 can prevent the elastomer polymer cylinders 7 and the washer members 6A, 6B, and 6C from dropping out of the rod member 51 when in installation. A bottom end 175 of the lower bolt member 172 is threadedly engaged to the threaded recess 203 of the mount member 201. The upper socket 171 and a portion of the lower bolt member 172 are slidably received in a relatively lower portion of the upper tube 16. The elastomer polymer cylinders 7 and the washer members 6 are limited between the cap portion 50 of the rod means 5 and the flange portion 174. A top washer member 6A contacts with the cap portion 50 of the rod means 5. A bottom washer member 6C contacts with the upper socket 171 of the socket bolt means 17. The top washer member 6A and the bottom washer member 6C are of the same construction while a little bit different with the other washer members 6B. Top washer member 6A and bottom washer member 6C each have one boss only, whereas all other washer members 6B have a boss each side. The boss of each washer member 6 is fitted into the central hole of the elastomer polymer cylinder 7.

As separately mentioned above, the upper tube 16 slidably holds the compressive units 7 and the upper socket 171 of said socket bolt means 17. A lower socket member 19 is threadedly engaged to a lower end of the upper tube 16. The lower socket member 19 is centrally holed for receiving the lower bolt member 172 therethrough and allowing the latter to slide therethrough. A first cushion 18 is positioned between the lower socket 19 and the upper socket 171 of the socket bolt means 17. A second cushion 9 is disposed on the mount member 201 of the lower tube 20 for receiving the striking force from the lower socket 19 when the upper tube 16 moves down.

Figure 4:
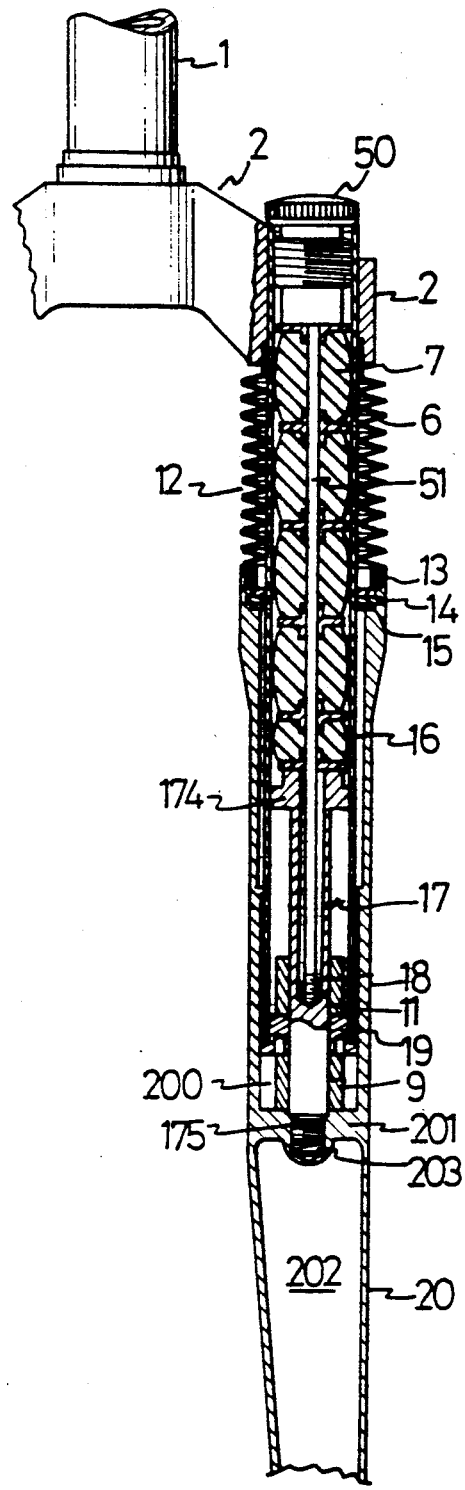
FIG. 4 is a cross-sectional view of the bicycle shock-absorbing apparatus in extremely compressed status.

FIGS. 3 and 4 illustrate the operation of the shock-absorbing apparatus 10 of the present invention. Normally, when the bicycle is operated on a smooth road, the shock-absorbing apparatus 10 of the present invention is in a non-compressed status as shown in FIG. 3. If the bicycle is operated on an uneven terrain, the shock-absorbing apparatus 10 will change to a compressed status as shown in FIG. 4. When the bicycle receives a shock from the uneven terrain causing the steerer tube 1 and the steerer crown 2 to move downward, which in turn causes the upper tube 16 to slide downward in the lower tube 20, compressing the compressive units 7, and causing the rod member 51 of the rod means 5 to move downward in the channel 173 of the socket bolt 17. When the upper tube 16 is forced to slide downward, the bellows 12 is compressed by a force from the steerer crown 2. The sliding distance of the rod means 5 is the same as that of the upper tube 16. The definition of the compressed status is not limited to the one as shown in FIG. 4. Basically, if the upper tube 16 is moved downward, the shock-absorbing apparatus 10 is in compressed status. Therefore, the compressed status can have different levels. FIG. 4 merely illustrates an extreme example of different levels of compressed status.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A bicycle shock-absorbing apparatus (10) clamped in a steerer crown (2) which is engaged to a steer tube (1) of a bicycle by a sleeve (3) and a C-clip (4) comprising a lower tube (20) having an upper cavity and a mount member (201) thereunder and an upper tube (16) partially and slidably received within said cavity of said lower tube (20), a rod means (5) having a cap portion (50) and a rod member (51) downwardly extending from said cap portion (50), said cap portion (50) being engaged to an upper end of said upper tube (16), a bellows (12) being engaged on a top end of said lower tube (20) and also slidably receiving a portion of said upper tube (16), a bellows (12) being engaged on a top end of said lower tube (20) and also slidably receiving a portion of said upper tube (16), said upper tube (16) and said bellows (12) being clamped by said steerer crown (2), a plurality of compressive units (7) being arranged longitudinally inside said upper tube (16), said rod member (51) of said rod means (5) penetrating through said compressive units (7), said cap portion (50) downwardly facing a top one of said compressive units (7), a socket bolt (17) having an upper socket (171) with a flange portion (174) and a lower bolt member (172), a channel (173) being defined from said upper socket (171) down to said bolt member (172), said lower bolt member (172) being engaged to said mount member (201) causing said compressive units (7) to be limited between said cap portion (50) of said rod means (5) and said upper socket (171) of said socket bolt means (17), said upper tube (16) slidable holding said compressive units (7) and said upper socket (171) of said socket bolt means (17), a lower socket member (19) being engaged to a lower end of said upper tube (16) while allowing said lower bolt member (172) to slide therethrough, a first cushion (18) being positioned between said lower socket (19) and said flange portion (174) of said upper socket (171) of said socket bolt means (17), such that when said bicycle receives a shock from an uneven terrain causing said steerer crown (2) to move downward, which in turn causes said upper tube (16) to slide downward in said lower tube (20), compressing said compressive units (7), and causes said rod member (51) of said rod means (5) to move downward in said channel (173) of said socket bolt (17).

2. A bicycle shock-absorbing apparatus (10) as claimed in claim 1, wherein each said compressive unit (7) is a elastomer polymer cylinder (7) having a through hole in the axis therein allowing said rod member (51) to pass through.

3. A bicycle shock-absorbing apparatus (10) as claimed in claim 2, wherein a plurality of centrally holed washer members (6) are interposed between said elastomer polymer cylinders (7) for distributing the tension thereof.

4. A bicycle shock-absorbing apparatus (10) as claimed in claim 1, further comprising a second cushion (9) disposed on the mount member (201) of said lower tube (20) for receiving the striking force from the lower socket (19) of said upper tube (16) when the upper tube (16) moves down.

5. A bicycle shock-absorbing apparatus (10) as claimed in claim 1 further comprising a threaded collar (11) which is threadedly engaged to a bottom end of said rod member (51) substantially contacting with the periphery of said channel (173) of said socket bolt (17), thereby enabling said rod member (51) to slide down stably inside the channel 173 of the socket bolt means 17 when the bicycle shock-absorbing apparatus (10) receives a shock.

6. A bicycle shock-absorbing apparatus (10) as claimed in claim 1, wherein said bellows (12) has the diameter of its periphery greater than the diameter of the lower tube (20), thereby preventing dust or the like dropping into the lower tube (20).

7. A bicycle shock-absorbing apparatus (10) as claimed in claim 1 further comprising a cable stop bracket (21) to engage two bicycle shock-absorbing apparatuses (10) together for reinforcing the strength therebetween.

8. A bicycle shock-absorbing apparatus (10) as claimed in claim 7, wherein said lower tube (20) has a socket portion (30) having four holes integrally formed at an upper periphery thereof for receiving and engaging with said cable stop bracket (21).

* * * * *